(No Model.) 11 Sheets—Sheet 1.

H. B. CAMP.
BRICK MACHINE.

No. 455,540. Patented July 7, 1891.

Fig. 1.

Witnesses:
G. N. Hinchman Jr.
C. E. Humphrey

Inventor:
Horace B. Camp,
By his Atty.,
C. P. Humphrey (No Model.)
11 Sheets—Sheet 2.

H. B. CAMP.
BRICK MACHINE.

No. 455,540.
Patented July 7, 1891.

Fig. 2.

Witnesses:
G. N. Hinchman Jr.
C. E. Humphrey

Inventor:
Horace B. Camp,
By his Atty.
C. P. Humphrey (No Model.) 11 Sheets—Sheet 3.
H. B. CAMP.
BRICK MACHINE.

No. 455,540. Patented July 7, 1891.

Witnesses:
G. N. Hinchman Jr.
C. E. Humphrey

Inventor:
Horace B. Camp,
By his Atty.
C. R. Humphrey

(No Model.) 11 Sheets—Sheet 4.

H. B. CAMP.
BRICK MACHINE.

No. 455,540. Patented July 7, 1891.

Witnesses:
G. N. Hindman Jr.
C. E. Humphrey

Inventor:
Horace B. Camp,
By his Att'y,
C. P. Humphrey (No Model.)  
H. B. CAMP.  
BRICK MACHINE.

No. 455,540. Patented July 7, 1891.

Witnesses:  
G. N. Hinchman Jr.  
C. E. Humphrey

Inventor:  
Horace B. Camp,  
By his Atty.  
C. R. Humphrey (No Model.)

H. B. CAMP.
BRICK MACHINE

No. 455,540.

Patented July 7, 1891.

Witnesses:
G. N. Hinchman Jr.
C. E. Humphrey

Inventor:
Horace B. Camp,
By his Atty. C. P. Humphrey (No Model.) 11 Sheets—Sheet 7.

H. B. CAMP.
BRICK MACHINE.

No. 455,540. Patented July 7, 1891.

Witnesses:
G. N. Hinchman Jr.
C. E. Humphrey

Inventor;
Horace B. Camp,
By his Atty.

(No Model.) 11 Sheets—Sheet 8.
H. B. CAMP.
BRICK MACHINE.

No. 455,540. Patented July 7, 1891.

Witnesses;
G. N. Hinchman Jr;
C. E. Humphrey

Inventor;
Horace B. Camp,
By his Atty.
C. P. Humphrey (No Model.) 11 Sheets—Sheet 9.
H. B. CAMP.
BRICK MACHINE.

No. 455,540. Patented July 7, 1891.

Witnesses:
G. N. Hinchman Jr.
C. E. Humphrey

Inventor:
Horace B. Camp,
By his Atty
C. P. Humphrey

(No Model.) 11 Sheets—Sheet 10.

H. B. CAMP.
BRICK MACHINE.

No. 455,540. Patented July 7, 1891.

Witnesses:
G. N. Hinchman Jr.
C. E. Humphrey

Inventor:
Horace B. Camp,
By his Atty
C. P. Humphrey (No Model.) 11 Sheets—Sheet 11.

H. B. CAMP.
BRICK MACHINE.

No. 455,540. Patented July 7, 1891.

Witnesses
G. N. Hinchman Jr.
C. E. Humphrey

Inventor:
Horace B. Camp,
By his Atty.
C. R. Humphrey

United States Patent Office.

HORACE B. CAMP, OF CUYAHOGA FALLS, OHIO.

BRICK-MACHINE.

SPECIFICATION forming part of Letters Patent No. 455,540, dated July 7, 1891.

Application filed October 3, 1890. Serial No. 366,987. (No model.)

*To all whom it may concern:*

Be it known that I, HORACE B. CAMP, a citizen of the United States, residing at Cuyahoga Falls, in the county of Summit and State of Ohio, have invented a certain new and useful Improvement in Brick-Machines, of which the following is a specification.

The objects of my invention are primarily to produce a new and improved machine which shall by a series of successive operations convert prepared clay into pressed brick and deliver it in stands on pallets ready for the dry-house; secondly, to provide new and improved devices to severally accomplish these successive operations, and, thirdly, to render the coacting parts simultaneous in their relative operation, so that the machine shall be substantially automatic.

To the accomplishment of these several objects my invention consists in certain novel construction, combination, and arrangement of mechanical parts, and in their peculiar relative action, as hereinafter described, and then specifically pointed out in the claims, reference being had to the accompanying drawings, which form a part of this specification.

In the accompanying drawings, in which similar letters of reference indicate like parts,
Fig. 15, an enlarged vertical section, on the line 3 3 of Fig. 2, of mechanism for forming and forcing forward continuous prisms of clay to the cutting mechanism;
Figs. 16 and 17, enlarged details in perspective of the driving and retaining devices of the mold-wheel;
Figs. 20, 21, 22, and 23, enlarged details, hereinafter described, of the receiving and conveying mechanism;
Figs. 24 and 25, enlarged details of the mold-wheel, and Figs. 26 and 27 details of the re-pressing dies hereinafter described.

Referring to the drawings, A is a framework, preferably of wooden beams, as shown, on which is a housing B, which will be ordinarily of cast-iron and substantially of the form shown. Journaled in suitable bearings in this housing is a shaft C, on the ends of which are mounted disk wheels C', having gear-teeth on their edges, and each having a wrist-pin C'' on its outer face and in their inner faces cam-races, hereinafter described, and for a purpose to be stated. A parallel shaft $C^3$ receives the power primarily from any proper source and communicates it to the wheels C' by means of pinions $C^4$. Immediately inside of the housing, on each side and opposite and concentric with the wheels C', are two circular disks D D, bolted to the housing A by brackets or other preferred manner and having inner annular flanges D' D', and in the upper quadrant of each flange is a vertical slot for a purpose to be stated, these flanges being further braced, held equidistant and parallel by bolts D'' D'', which pass between them and enter elongated sleeves, where they are retained by nuts. The outer faces of these flanges are concentric with the shaft C, and being accurately turned smooth, constitute bearings for the wheel hereinafter described, which contains the brick-molds, and which for the purpose of this specification is called the "mold-wheel." This mold-wheel, which will be readily understood by reference to the enlarged details in Figs. 8, 9, 16, 24, and 25, consists of oppositely-disposed heavy metallic rings E E, accurately bored to fit on the flanges D' D', and between which extend twelve composite beams E' E', the central part of each of which is a flat bar $e$, terminating at each end in a bolt to enter suitable holes in the rings and be retained by nuts (see Fig. 25) and having grooves on each side, and the outer parts, consisting of short bars $e'$, have a dovetailed shape in cross-section placed on each side of the central bar $e$, with their wider edges outward and having tongues that enter the grooves in the central bar. By this construction the faces of adjacent bars on opposite beams are parallel with each other and with a radius from the shaft C, passing immediately between them, and constitute molds for the ends of the brick.

Interposed across the spaces between the beams E' E' and between the ends of adjacent bars $e'$ $e'$, in gains for that purpose, are metallic partitions $e^2$ $e^2$, having tongues to enter the central bar and divide the spaces into six compartments. The bars $e'$ $e'$ and partitions $e^2$ $e^2$ are preferably of chilled iron or steel, and the compartments formed by them, which are open on the inside and outside of the wheel, are of suitable size to constitute molds for the thinner edges of the brick, but are deeper in the opposite direction to afford space to receive the green billet of clay before it is re-pressed.

Figure 8:
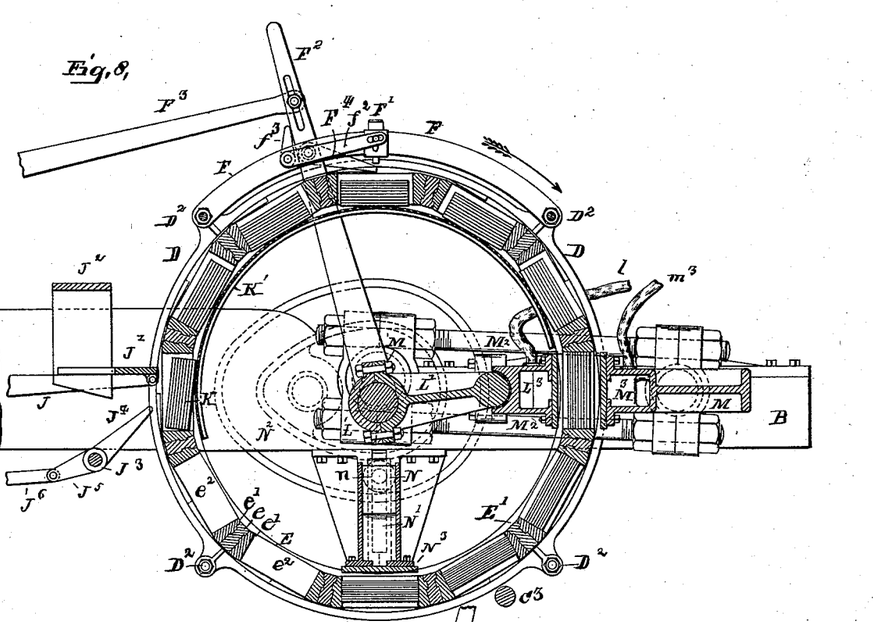
Figs. 8 and 9, vertical sections of the mold-wheel and immediately-connected parts in different positions hereinafter described, on the line 8 9 of Fig. 5.
Figure 9:
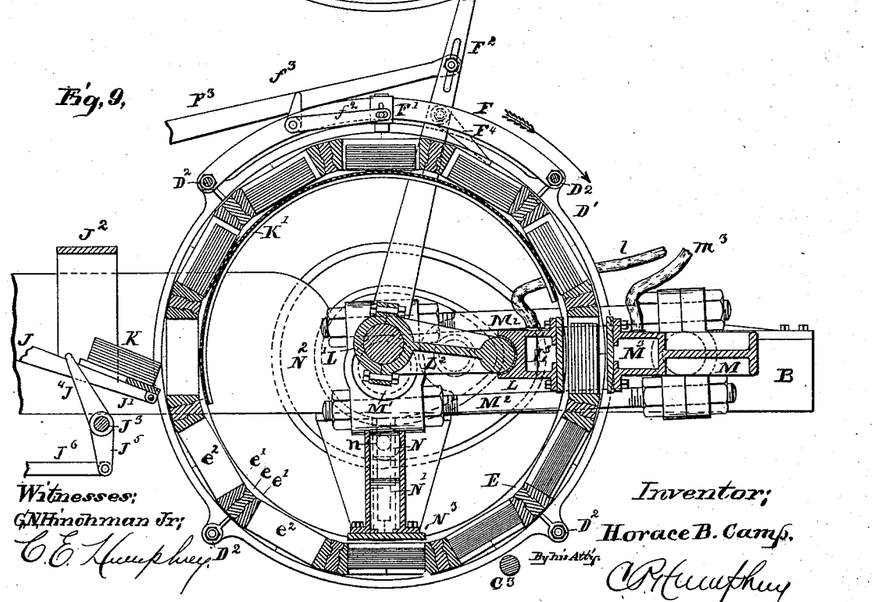
Figures 15, 16, 17:
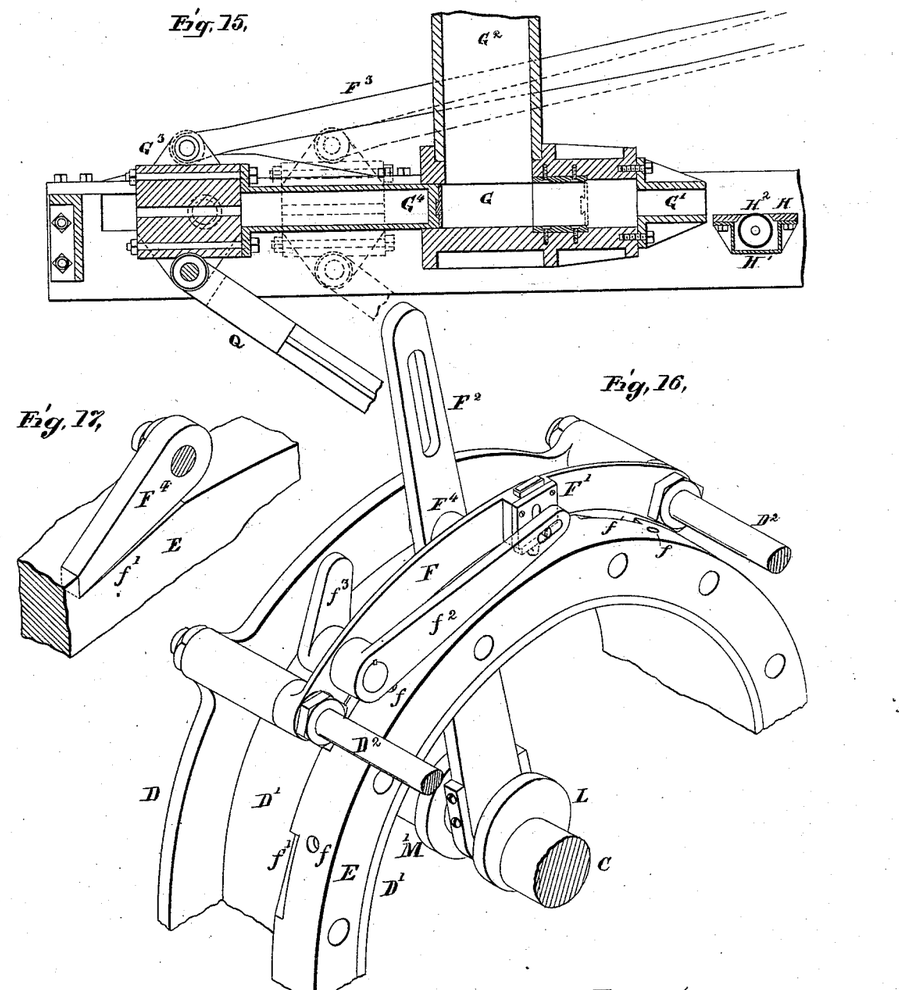
Figures 24, 25, 26, 27:
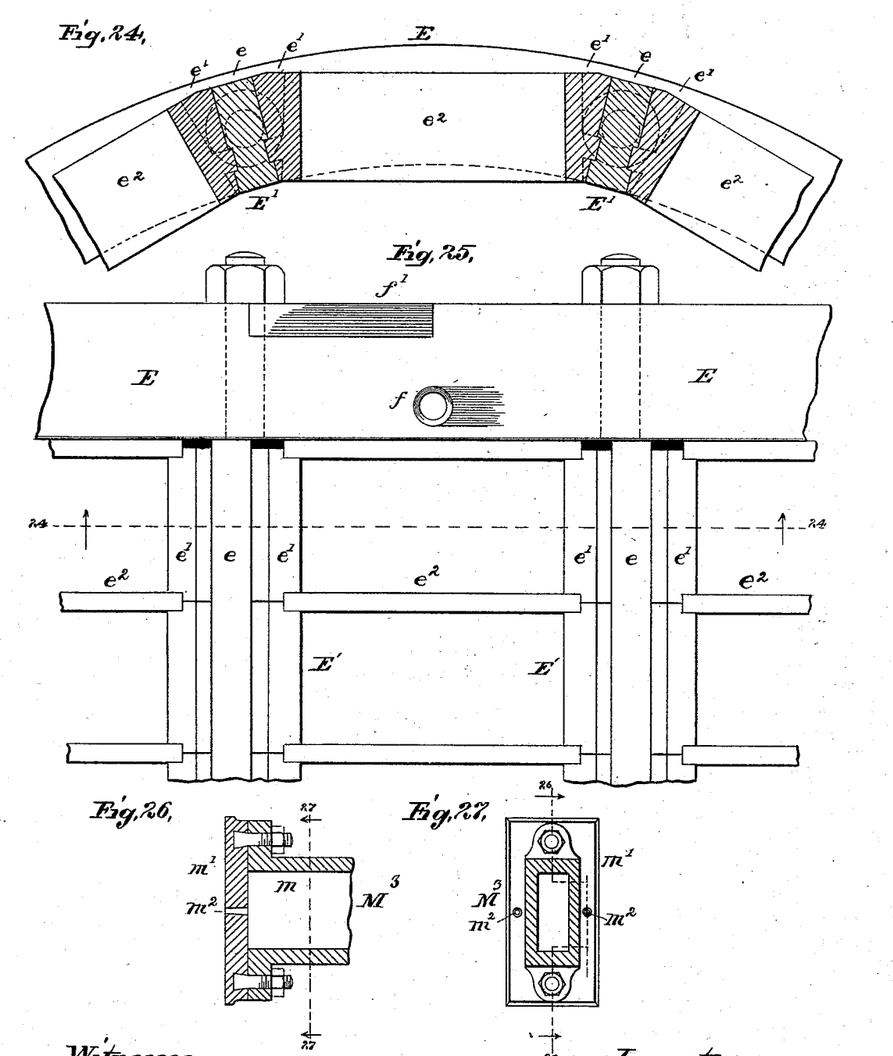

In the outer peripheries of the rings E are a series of holes $f$, arranged to receive locking-bolts and having sloping approaches in the direction of the revolution of the mold-wheel, as indicated by arrows in Figs. 8 and 9, and notches $f''$, Fig. 17, to engage driving-pawls. These holes and notches are equal in number and preferably in longitudinal alignment with the centers of the brick-molds, as shown in Fig. 25.

Mounted between the upper bolts of the disks D D, on each side of the machine, are curved bars or bridges F F, in the center of each of which are mounted vertically-sliding bolts F' F', Fig. 16, which fall when free by gravitation, or may, if preferred, be forced down by springs, and are arranged to enter the holes $f$ and until withdrawn retain the mold-wheel from revolution. In the bridges are journaled short rock-shafts bearing on one end arms $f^2$, having slotted ends to engage pins projecting from the bolts F' F', and on the other ends shorter arms $f^3$, which are in alignment with the slots in the flanges D', hereinbefore mentioned. Loosely mounted on the shaft C are rocking arms F$^2$, which extend through the slots in the flanges D' and are united with a reciprocating cross-head, hereinafter described, by adjustable connecting-rods F$^3$. Each arm bears a pawl F$^4$, arranged to successively engage the notches $f''$ as it is rocked, and carry forward the mold-wheel one-twelfth of a revolution at each stroke.

Figure 1:
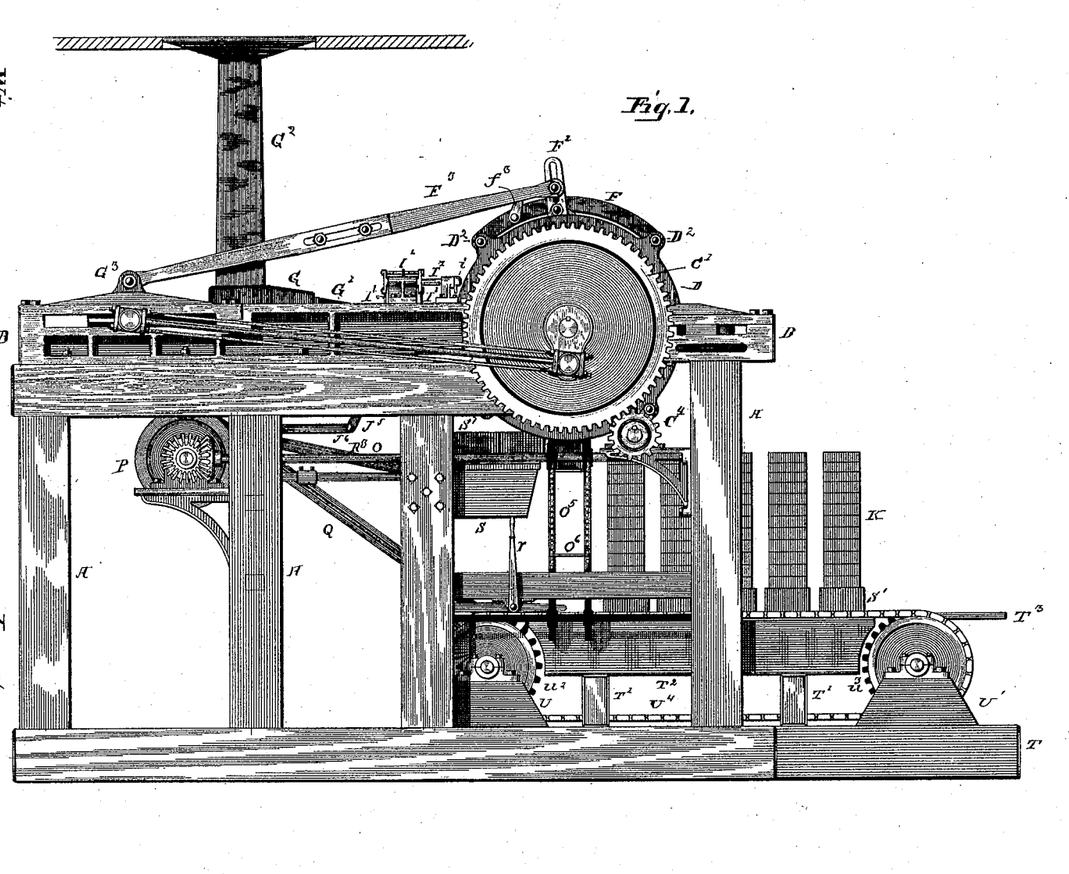
Figure 1 is a side elevation of the complete machine.
Figure 2:
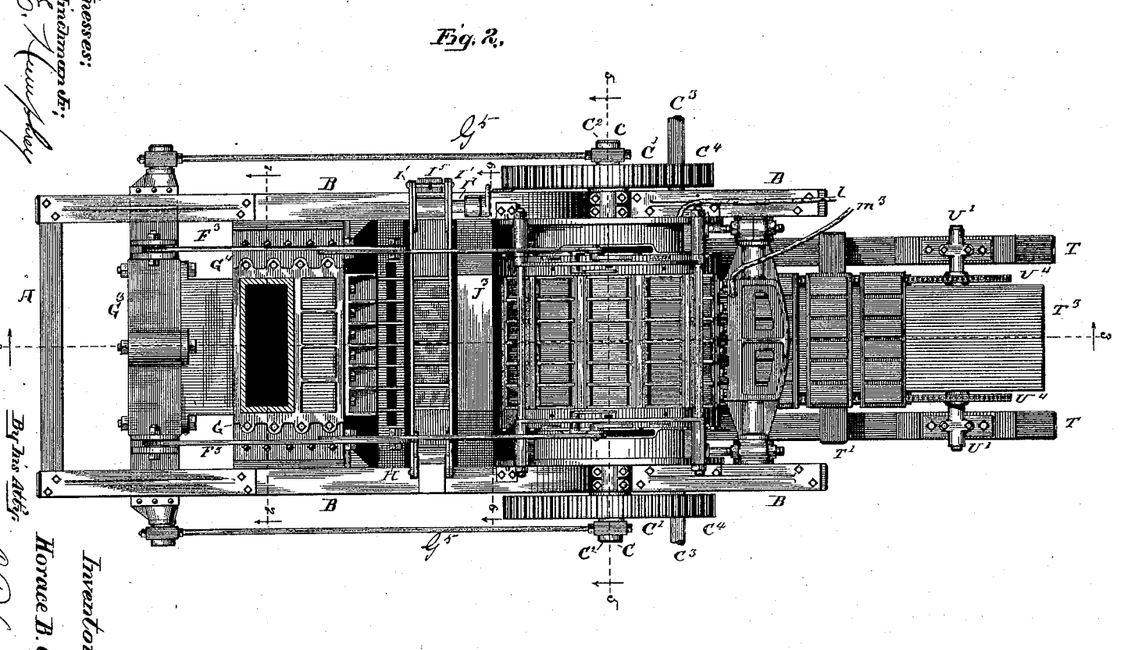
Fig. 2, a plan of the same with the feeding-spout in section, as hereinafter described.
Figure 7:
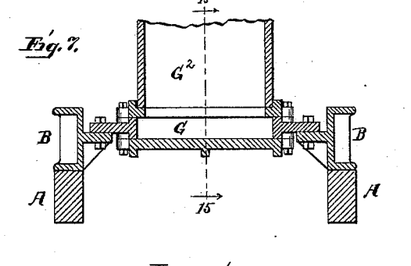
Figure 12:
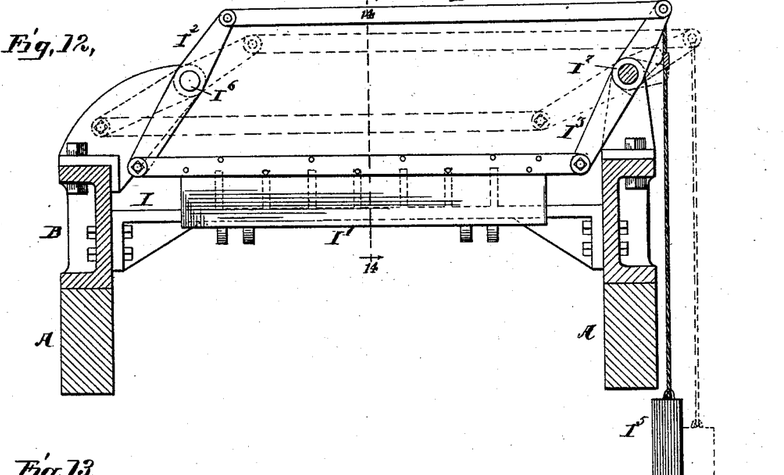
Fig. 12, a transverse section of the housing at the line 12 12 of Fig. 13, showing the cutting device in elevation.
Figure 13:
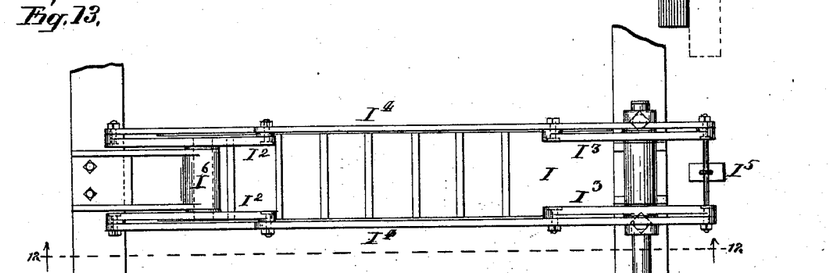
Fig. 13, a plan of the cutting device.
Figure 14:
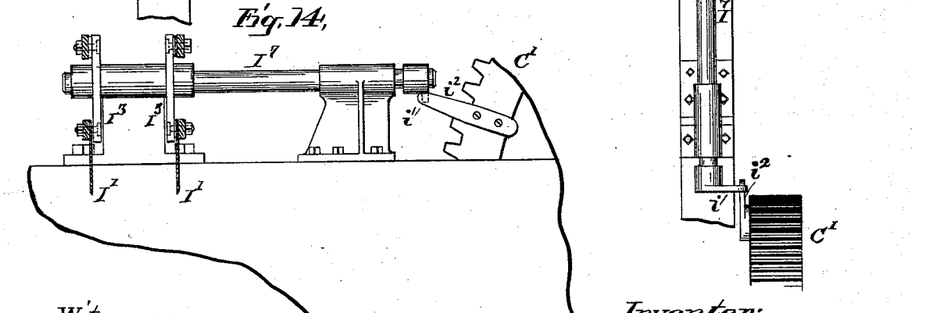
Fig. 14, a transverse section of the cutting device at the line 14 14 of Fig. 12.

Mounted on the housing B at the left of the mold-wheel and in alignment with the center of the shaft C is a horizontal rectangular case G, (shown in section in Fig. 7 at the line 7 7 of Fig. 2,) of the same width as the sets of molds in the mold-wheel, but exceeding in depth the thickness of the desired billet. On the end of this case toward the mold-wheel is a reduced discharge end or die G', of the same lateral width, but having a depth equal to the thickness of the desired billet and divided by partitions equal in number and in alignment with the partitions $e^2$ of the mold-wheel. In the top of this case is an opening which registers with the open lower end of a feeding-spout G$^2$, through which the prepared clay is fed to the machine. This spout ordinarily descends from an upper floor or platform, where the clay is prepared or conveyed when prepared, and slightly increases in size toward its lower end to prevent the clay from clogging or choking therein. In the housing B beyond the case G are guides or skeins in which a cross-head G$^3$ is arranged to slide, carrying a plunger G$^4$, which fits the interior of the case G and is arranged to move reciprocally across the opening below the lower end of the spout G$^2$. On the ends of this cross-head are wrist-pins united with the wrist-pins C$^2$ by connecting-rods G$^5$. Immediately in front of the die G' is a narrow platform or table H, having in its face a longitudinal slot and beneath a tank H', containing a lubricant, as oil. Mounted in suitable bearings across and partially submerged in this tank and projecting through the slot in the table H is a roller H$^2$, of absorbent material, as felt. In front of the table H and separated therefrom by a narrow space is a second table I, having in its upper surface a series of partitions equal in number and in alignment with the partitions $e^2$ in the mold-wheel and those in the die G'. Above the opposite edges of this table are two vertically-swinging parallel knives I', supported on the lower arms of rocking levers I$^2$ I$^3$, the upper ends of which levers are united by a bar I$^4$. (See Figs. 12, 13, and 14.) The distance between these knives is the length of the desired billet, and they are normally held upward by a weight I$^5$, as indicated by dotted lines in Fig. 12, sufficiently high to permit the prisms of clay hereinafter mentioned to pass, and when swung downward, as indicated by solid lines in the same figure, their edges pass below the face of the table I. The levers I$^2$ swing freely on a pin I$^6$, running through a proper support mounted on the housing; but the levers I$^3$ are keyed to a rock-shaft I$^7$, Fig. 13, journaled in bearings on the housing B and parallel with it. On one end of the rock-shaft I$^7$ is a short crank-arm $i'$, and on the wheel C' a finger or tappet $i^2$, arranged to encounter the crank-arm $i'$, thereby rocking the shaft and causing the knives I' to swing downward at each revolution of the wheel C'.

Figure 6:
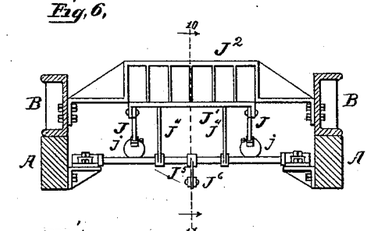
Figs. 6 and 7, transverse vertical sections of Fig. 2 at the lines 6 6 and 7 7, respectively.
Figure 10:
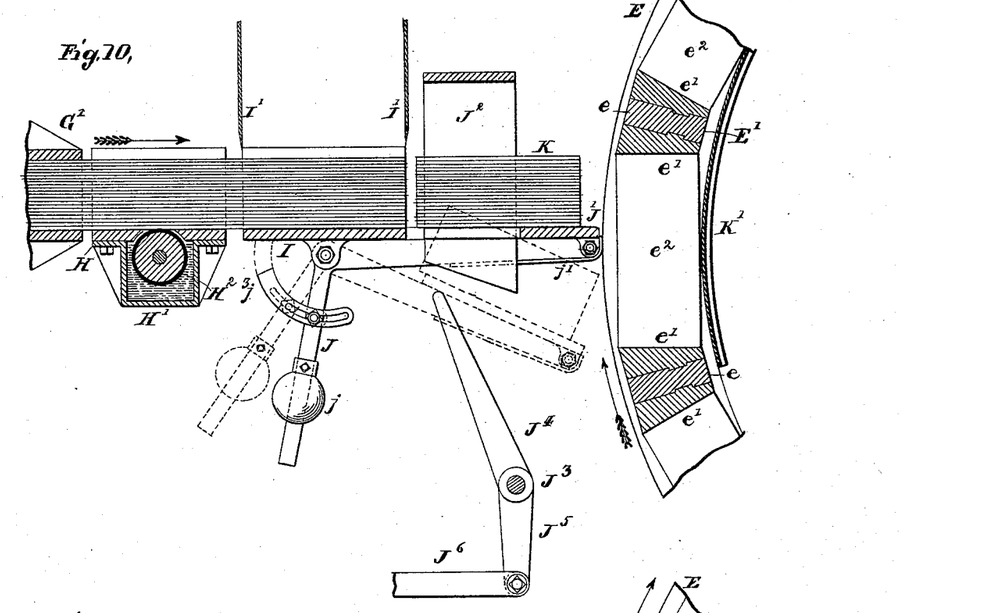
Figs. 10 and 11, enlarged segments in section of the mold-wheel and adjacent parts, showing in different positions the operation of cutting and placing the green billets therein.

Directly below the table I and pivoted thereto at their angles are two bent levers J, to the ends of the horizontal arms of which is hinged a third table J', which normally swings back and rests thereon by gravitation, but is arranged to swing upward and forward, as hereinafter detailed. The table J', when horizontal, as shown in Figs. 8 and 10, fills with slight spaces at each edge the opening between the table I and mold-wheel, and with the tables H and I practically constitutes a continuous platform from the die G' to the mold-wheel. The table J' is normally held horizontal by adjustable weights $j$ on the pendent arms of the levers J, and when in that position rests below a bridge $J^2$, (see Figs. 6, 8, and 9,) provided with pendent blades or partitions in alignment with the partitions in the mold-wheel and die. Springs $j'$ assist to swing the table J' back on the arms of the levers J after it has been swung forward, as hereinafter described.

Figure 11:
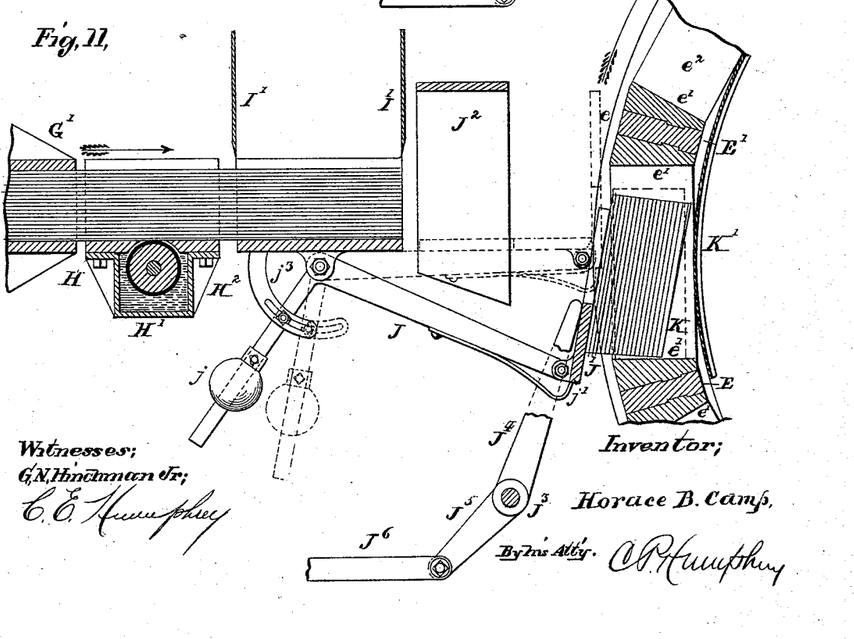

The operation of the mechanism thus far described is as follows: Power, being applied to the shaft $C^3$, turns, through the pinion $C^4$, the gear-wheels C' with a revolution preferably of about ten per minute, and these, through the connecting-rods $G^5$, give a reciprocating movement to the cross-head $G^3$, which in turn, by means of connecting-rods, swings the rock-arms $F^2$. When the cross-head is at the end of the forward stroke, by which is meant the movement toward the mold-wheel, the rock-arms $F^2$ are at the forward ends of the slots in the annular flanges D' and the bolts F' rest in the holes $f$ and retain the mold-wheel rigidly in place with the upper and lower sets of molds vertical and the side sets horizontal and in alignment with the tables H I J'. (See Figs. 8, 9, 10, and 11.) As the cross-head recedes the rock-arms $F^2$ swing back, until just before the end of the stroke they encounter the short arms $f^3$, and through the shafts mounted in the bridges F swing the arms $f^2$ and raise the bolts F', and at the end of the stroke the pawls $F^4$ engage opposite notches $f'$. On the return the mold-wheel is carried forward one-twelfth of a revolution until at the end of the stroke the bolts F', having been released, enter the next succeeding holes and again retain it. The prepared clay is fed into the spout $G^2$, through which it falls by gravitation into the case G, and at each forward stroke of the cross-head $G^3$ the plunger $G^4$ forces forward an amount equal to the area of the case into the forward part, where, being retarded by the reduced size of the die G', it is compressed into a solid mass, and being divided by the partitions it issues in six continuous streams of prismatic form. The dimensions of the parts are so proportioned and adjusted that at each forward stroke these prisms will move forward as nearly as they can be regulated to do the length of the desired billet, and as they issue from the die G' they pass over the table H, where their under surfaces are lubricated by the roller $H^2$, onto the table I, where by the intermittent action of the knives I' they are severed into billets K, the tappet $i^2$ being so situated as to engage the crank-arm $i$, Fig. 13, immediately after the forward stroke of the cross-head $G^3$, the excess of clay, if any, of each prism being cut off by the forward knife and falling between the tables I and J as the latter is tilted, as hereinafter explained, thereby producing billets of exactly the same length and in alignment with each other. The knives I' are immediately retained by the weight $I^5$, and at the next forward stroke of the plunger $G^4$ the cut billets K are forced onto the table J', Fig. 10, where their weight overcomes the weights $j$ and swings it downward, bringing their lower front corners opposite the lower outer edges of one set of openings in the mold-wheel, Figs. 3, 9, and 10, the exact position being secured by an adjustable curved stop-bar $j^3$, attached to the pendent arm of the levers J under the table J', and journaled in suitabte bearings in the frame A is a rock-shaft $J^3$, bearing two rocking levers $J^4$, arranged to swing free of the table J' when the latter is horizontal, Figs. 6, 8, and 10, and to engage it when it swings downward, Figs. 9 and 11. On the shaft $J^3$ is a crank-arm $J^5$, having its end united by a connecting-rod $J^6$ with an intermediate part of a connecting-rod Q, hereinafter described and for a purpose to be stated, which is pivoted to and moves with the cross-head $G^3$. Hence after the table J' is swung downward by the weight of the billets K, as just described, by the return-stroke of the cross-head $G^3$ the upper ends of the levers $J^4$ are rocked forward and swing the table J' upward and forward and tilt the billets into the opposite spaces in the mold-wheel, Figs. 8 and 11. At the next forward movement of the mold-wheel the table J' ascends with it, forcing the lower ends of the billets into the molds, until when the longer arms of the levers $J^4$ are horizontal it falls back upon them by gravitation, having been given an impulse by the springs $j'$. The billets thus successively fed into the mold-wheel are carried around with it at each intermittent forward movement and sink into the molds by gravitation as they ascend, but are prevented from falling therefrom by a shell K', supported by the housing immediately inside of and concentric with the mold-wheel and extending from the lower ends of the set of molds adjacent to the tilting table J' to a point near the upper ends of the molds on the opposite side of the mold-wheel.

Mounted in skeins or guides in the housing on the opposite side of the shaft C from the tilting table J' are two cross-heads L M in alignment with each other, the former within and the latter outside of the mold-wheel and arranged to slide with reciprocating movements to and from each other. The cross-head L is operated by means of a thrust-arm or connecting-rod $L^2$ by an eccentric-cam L', mounted on the shaft C, and the cross-head M is similarly operated by cams M' on the same shaft through the connecting-rods $M^2$, the cams L' M' having their greatest radii directly opposite, so that the cross-heads L M shall simultaneously approach and recede from each other, and so arranged that their approaching strokes will end in the middle of the intervals when the mold-wheel is stationary. The cross-heads L M bear, respectively, sets of plungers or pistons $L^3$ $M^3$, similar in construction, of suitable size to fit the molds in the mold-wheel, and arranged to register with and enter from opposite sides each set as it is brought between them and press the billets of clay therein to the proper thickness. The stroke of the cross-heads L M is sufficient to withdraw the plungers $L^3$ $M^3$ from the sets of molds before the next forward movement of the wheel. The plungers, one of which $M^3$ is shown enlarged in detail in Figs. 26 and 27, are constructed hollow to permit of their being heated by steam, and preferably consist of a hollow case $m$ and a plate $m'$ bolted thereto. In the plate $m'$ are a series of holes $m^2$, whose number may be increased as the requirements of the machine may determine and for the purpose of permitting a part of the clay from the larger or more compact billets to escape, so that each set may be simultaneously pressed of an even consistency. The hollow interiors of these plungers L M are, when in operation, heated with steam from any suitable source by means of flexible tubes $l m^3$. Attached to the housing B, in perpendicular alignment with and below the shaft C, are vertical guides $N'$, in which is arranged to slide a cross-head N, the ends of which, bearing friction-rollers $n$, rest in cam-races $N^2$, hereinbefore referred to, and shown in Figs. 3, 5, 8, and 9, on the inner faces of the wheels $C'$, and which give a vertical reciprocating motion to the cross-head at each revolution of the shaft C. From the lower face of this cross-head N projects a series of plungers $N^3$, arranged to enter in their descent the set of molds when stationary, successively brought under them at each partial revolution of the mold-wheel and push the pressed billets outward therefrom. In contour these cam-races $N^2$ consist of a semicircle and a semi-ellipse united at the minor axis of the latter and so arranged that the cross-head N shall be forced downward and returned while the mold-wheel is stationary and be suspended sufficiently high to permit it to pass during its partial revolution. By the arrangement of mechanism thus far described it will be seen that at each intermittent rest of the mold-wheel there is simultaneously one set of fresh billets fed thereto, one set pressed to proper size between the heated plungers $L^3$ $M^3$ and one set forced out by the plungers $N^3$.

Figure 18:
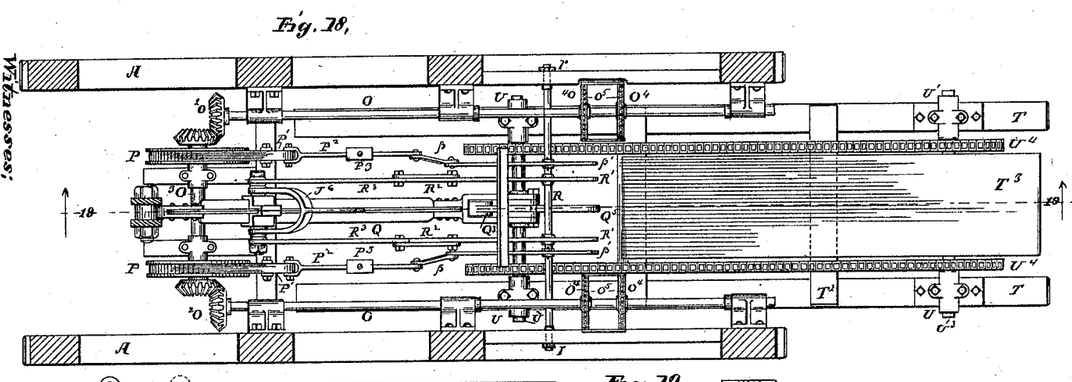
Fig. 18, a section and plan of the machine at the line 18 18, Fig. 19.

Inside the frame A on each side, journaled in suitable bearings and below the lower face of the mold-wheel, are two horizontal shafts O, and directly below and about midway between them and the base of the frame, similarly journaled, are counter-shafts $O'$. The shafts O are each provided at one end with bevel-gears $O^2$, which mesh in similar gear-wheels on the ends of a horizontal transverse shaft $O^3$, journaled in bearings supported on brackets attached to the frame A below the cross-head $G^3$, by which arrangement the shafts O are compelled to revolve in unison in opposite directions, Fig. 18.

Figure 3:
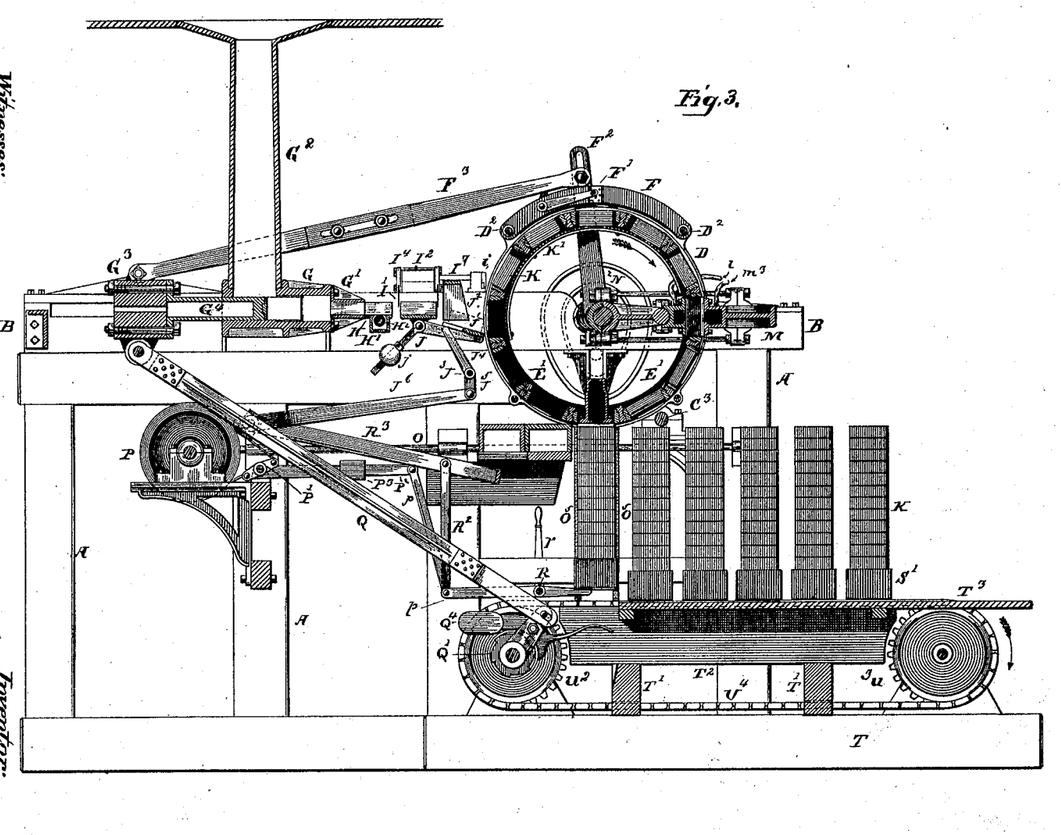
Fig. 3, a central vertical longitudinal section at the line 3 3 of Fig. 2.
Figure 4:
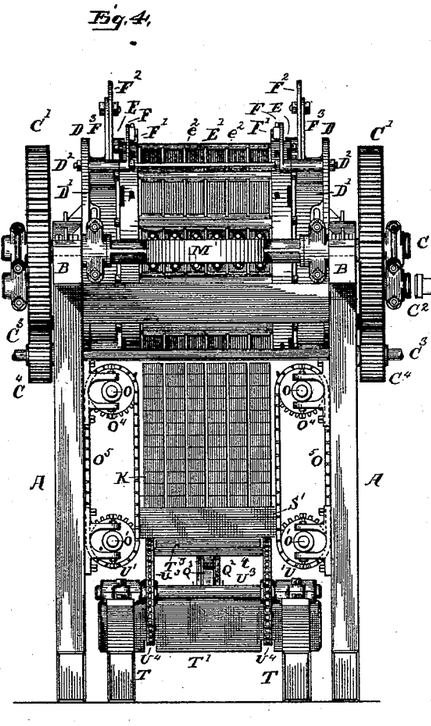
Fig. 4, an end elevation of the same looking from the right of Fig. 1.
Figure 5:
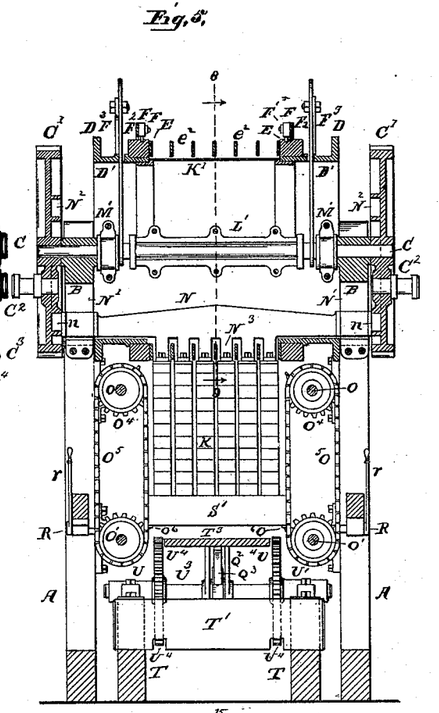
Fig. 5, a transverse section at the line 5 5 of Fig. 2.
Figure 19:
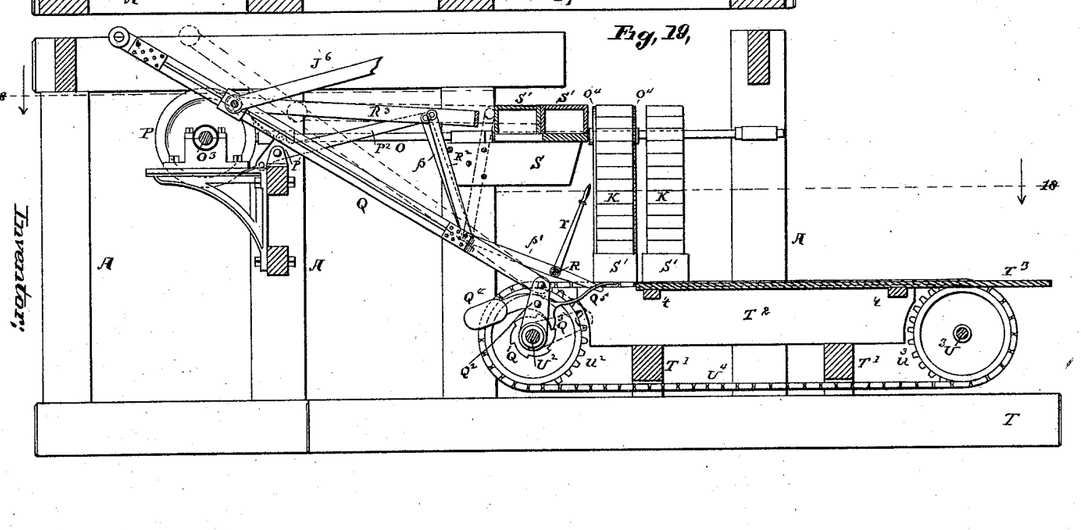
Fig. 19, a central vertical section at the line 19 19 of Fig. 18.
Figures 21, 22, 23:
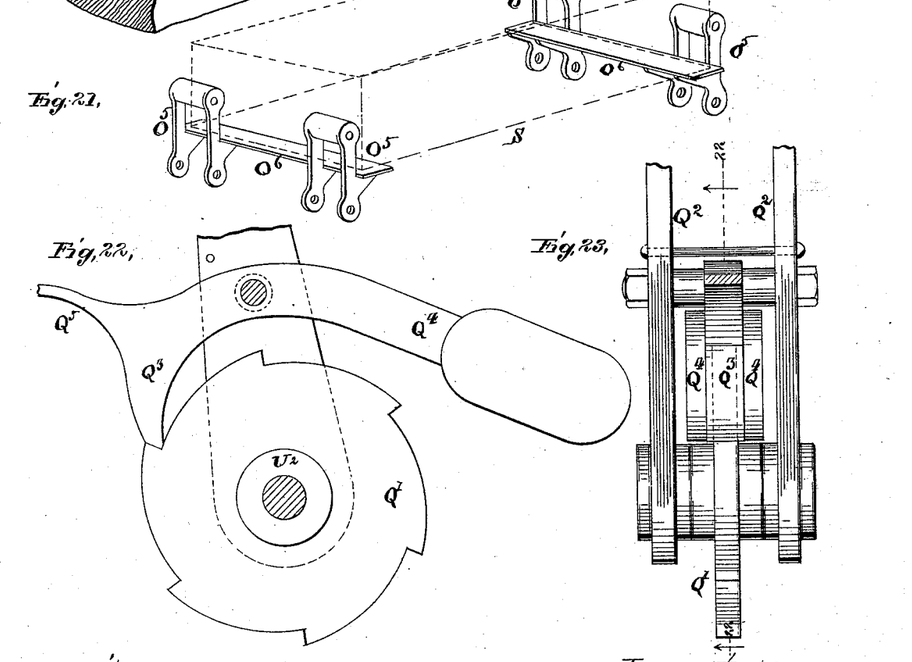

Mounted on each of the shafts $O O'$, in vertical alignment with the outside of the set of molds from which the pressed brick are forced by the plunger $N^3$, are pairs of sprocket-wheels $O^4$, over which, on each side between the shafts $O O'$, run pairs of endless sprocket-chains $O^5$. Between the pairs of sprocket-chains, on each side at determined intervals, to be hereinafter explained, extend narrow steps $O^6$, an enlarged detail of one of which is shown in Fig. 21, which project beyond the face of the chains and are so arranged that the steps on opposite sides of the machine shall register horizontally as the chains descend. Near each end of the shaft $O^3$ are mounted two flanged pulleys P, about each of which are elastic brake-bands having their respective ends attached to the opposite ends of short centrally-pivoted rocking levers $P'$, from which extend arms $P^2$, either integral therewith or so attached as to rock with them, and on which are adjustable weights $P^3$, Fig. 18, which, except when raised, as hereinafter explained, constantly draw the bands on the pulleys and constitute a brake to retard or arrest the revolution of the shafts $O O' O^3$. The other ends of the arms $P^2$ are respectively connected by links $p$ with the ends of a pair of levers $p'$, rigidly mounted on a rock-shaft R, Figs. 3, 18, and 19, journaled in the frame A, the opposite ends of which levers extend so as to be partially vertically under the position of the set of dies from which the pressed brick are discharged. On the shaft R are also loosely mounted two like levers $R'$, having their ends similarly connected by links $R^2$ with the intermediate parts of two rods $R^3$, which are pivoted at one end with the connecting-rod Q at the same point as the connecting-rod $J^6$, as hereinbefore described, Figs. 3, 18, and 19, and are united at the other by a flattened cross-bar, for a purpose to be stated. These levers $p' R'$ are mounted in the same plane, and when at rest are horizontal, as shown in Figs. 1 and 3. Under a part of the mold-wheel and adjacent to the sprocket-chains $O^5$ and having a length substantially equal to the distance between them, is a horizontal table S, whose surface is slightly below the centers of the shafts O. The rods $R^3$ are so arranged that when the levers $R'$ are horizontal, as shown in Figs. 1 and 3, their ends, united by the cross-bar, will pass in the reciprocating motion given by the connecting-rod Q under the table S, but when the levers $R'$ are rocked, as shown in Fig. 19, will pass above and across it and push any object on it forward. A hand-lever $r$ on the shaft R is provided, by which the shaft R may be rocked and the brake-bands on the pulleys P released when desired.

Between the lower sills of the frame A is a second frame which rests on the same floor or foundation and is composed of two sills T, parallel with each other and with the sills of the frame A, from which they are separated by slight spaces on each side, and which extend from a point substantially under the packer-case G about one-third their length beyond the end of the frame A. Mounted in bearings U U' on the sills T are transverse horizontal shafts $U^2$ $U^3$, the former vertically under the pallet-table S and the latter near the ends of the sills T. Each shaft bears two sprocket-wheels $u^2 u^3$, respectively, of the same size as the wheels on opposite shafts, being in vertical alignment.

Figure 20:
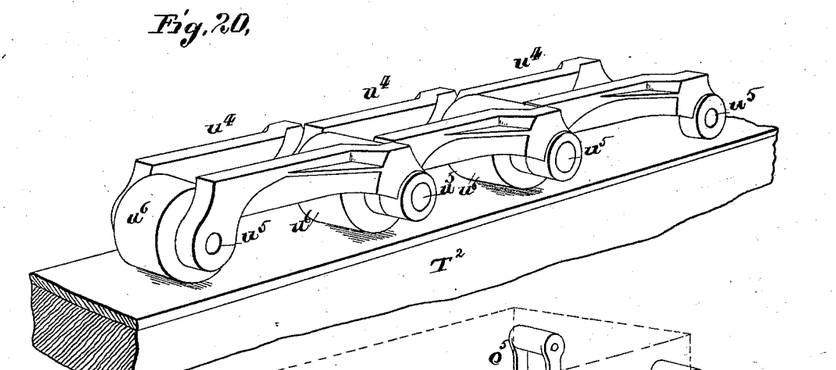

Two heavy cross-beams T' extend between the sills T and support two deep narrow horizontal beams $T^2$, placed on edge, oppositely disposed in alignment with and extending between the sprocket-wheels $u^2$ $u^3$. The upper edges of the beams $T^2$ are in the same horizontal plane with the top of the sprocket-wheels $u^2$ $u^3$, and are preferably shod with iron, as shown in enlarged detail in Fig. 20, and their ends are curved from below to enable them to partially extend over said wheels. On the wheels $u^2$ $u^3$ run sprocket-chains $U^4$, of peculiar construction, an enlarged detail of which is shown in Fig. 20, and which consists of links $u^4$, having their ends of such configuration as to unite and permit their free flexion, with their tops of an even plane and united by pivots $u^5$, on which are friction-rollers $u^6$, which run on the iron-shod edges of the beams $T^2$. Supported on cross-beams $t$, which extend between the beams $T^2$, is a platform $T^3$, which extends from a point vertically below the back of the set of molds in the mold-wheel, from which the completed brick are delivered beyond the sprocket-wheels $u^3$, of such width as to fill the space between the sprocket-chains and having its surface slightly below the plane of the upper faces of said chains. On the shaft $U^2$, midway between its ends, is rigidly mounted a ratchet-wheel Q', on each side of which, on the same shaft, are loosely mounted rock-arms $Q^2$, united by a bolt, and between which is pivoted a pawl $Q^3$, enlarged details of which parts are shown in Figs. 22 and 23, which pawl is arranged to engage the ratchet-wheel, but is normally held from contact therewith by a weighted arm $Q^4$, and has opposite said arm a finger $Q^5$, which projects vertically below the center of the mold-wheel, Figs. 3 and 19. The outer ends of the rock-arms $Q^2$ are pivotally united with one end of the connecting-rod Q, hereinbefore referred to, and are constantly rocked by the reciprocating movement of the cross-head $G^3$, without affecting the shaft U, until the pawl $Q^3$ is caused to engage the ratchet-wheel Q'.

The operation of the several parts of the machine just described and from the issuing of the pressed brick from the mold-wheel, as hereinbefore described, are as follows: The machine being put in motion, the sprocket-chains $O^5$ are moved until one set of the pallet-steps $O^6$ registers with the pallet-table S, on which are placed by hand-pallets S' opposite steps $O^6$ of the sprocket-chains $O^5$. The number and arrangement of the steps on the sprocket-chains $O^5$ are such as to cause a new set to register with the pallet-table S as each preceding pallet, carrying its load of brick, completes its downward movement, as hereinafer described. As each pallet is thus placed, it rests directly under and in close proximity to the set of molds from which the completed bricks issue and receives them as they are forced out by the plunger $N^3$. The force of the plunger $N^3$ overcomes the resistance of the brake-pulleys P and at each stroke causes the pallet to descend the thickness of one brick, thereby piling the bricks in stands on the pallets until, as the number for which the machine is adjusted in the drawings is twelve, the pallet reaches the sprocket-chains $U^4$. This, it will be remembered, occurs during the back-stroke of the cross-head $G^3$ and produces three substantially simultaneous and distinct operations of the mechanism, viz: First, the descending pallet encounters the ends of the levers P' R' and rocks them, as shown in Fig. 19, which raises the rods $R^3$ above the plane of the pallet-table S, as hereinbefore described; second, the same movement raises the weighted arms $P^3$ and releases the brake-bands from the pulleys P, which permits the loaded pallet to rest on the sprocket-chains $U^4$ and relieves the pallet-steps $O^6$ of their weight, and hence of friction, as it is carried from them; third, the finger $Q^5$ of the pawl $Q^3$ as it rocks up encounters the pallet, Fig. 19, and is tilted down to engage the ratchet Q', Fig. 22. The return-stroke of the cross-head $G^3$, by means of the connecting-rod Q, pawl Q', and ratchet $Q^3$, gives a partial revolution to the sprocket-wheels $u^2$, which moves the sprocket-chains $U^4$ forward, carrying the loaded pallet from under the discharge-dies, the parts being so proportioned and adjusted that this movement shall slightly exceed the width of the pallet. As the pallet and load pass forward, as just stated, the rods $R^3$, actuated as hereinbefore described, push another pallet from the table S onto the set of steps $O^6$, brought opposite it in the manner heretofore explained, the stroke of the rods $R^3$ being adjusted to force a single pallet onto the steps at each forward movement, as indicated by dotted lines in Fig. 21. The lever-arms $p'$ on the rock-shaft R extend only a short distance under the descending pallet, and hence are released soon after the latter commences to move forward, thereby permitting the weighted arms $P^2$ to fall and tighten the brake-bands on the pulleys P and sustain the weight of the next pallet when it rests on the steps $O^6$. On the next back-stroke of the cross-head $G^3$ the rods $R^3$ are drawn back from the table S and fall to their original position. The loaded pallets are successively carried forward on the sprocket-chains U⁴ until they reach the wheels $u^3$, where they are conveyed to the dry-house by appropriate means.

Reference-letters that indicate like parts have not been placed on all figures of the drawings where the same parts are shown, as in many the attempt to do so would result in confusion of lines; but where these are omitted their relative positions and forms will be readily understood by reference to the figures where they appear.

It is not intended by the foregoing specification and drawings to limit my invention to the exact construction, proportions, or assemblage of parts shown, as these may be modified in many ways, according to the requirements of the machine, or for other causes, without departing from the peculiar features of my invention, which I claim to be new, and desire to secure by Letters Patent, and which are—

1. In a brick-machine, the combination of a wheel having sets of radial molds in its periphery and arranged to revolve with intermittent rests of the tilting feed-table J' and its operating mechanism to deliver billets of clay to one set of molds at each rest, substantially as shown and described.

2. In a device for receiving pressed billets from brick-molds, the combination, with oppositely-disposed sprocket-chains having shelves to receive the pallets, of a brake apparatus to retard the descent of said pallets, substantially as shown and described.

3. In a device for receiving pressed billets from brick-molds, the combination, with oppositely-disposed sprocket-chains having shelves to receive the pallets, of a brake apparatus to retard the descent of said pallets and arranged to be released by the descent of said pallets, substantially as shown and described.

4. In a device for receiving pressed billets from brick-molds, the combination, with oppositely-disposed vertically-moving sprocket-chains having shelves to retain pallets, of oppositely-disposed horizontally-moving sprocket-chains arranged to receive the pallets from the vertically-moving chains, substantially as shown and described.

5. In a device for receiving pressed billets from brick-molds, the combination, with oppositely-disposed vertically-moving sprocket-chains arranged to support pallets to sustain the pressed billets, and horizontally-moving sprocket-chains to receive said pallets as they descend, of actuating mechanism, as a pawl and ratchet, to intermittently carry forward said horizontal sprocket-chains, substantially as shown and described.

6. The combination, with vertically-moving sprocket-chains adapted to support pallets, of devices, as levers and push-rods, arranged to be actuated by the descent of the pallets and force a succeeding pallet onto the sprocket-chain shelves, substantially as shown and described.

7. In a brick-machine, the combination of the mold-wheel E, having its periphery provided with sets of radial molds, the disks D, having slottted annular flanges D', the rock-arms F², the cross-head G³, and the connecting-rods F³ and G⁵, substantially as shown and described.

8. In a brick-machine, the combination of the tables H I, the knives I', the tilting feed-table J', and the intermittently-rotary mold-wheel E, substantially as shown and described.

9. In a brick-machine, the combination of the mold-wheel E, having its periphery provided with sets of radial molds, the horizontal rectangular case G, having a reduced discharge end or die G' divided by vertical longitudinal partitions, the plunger G⁴, the tables H and I, the knives I', the weight I⁵, and the tilting feed-table J', substantially as described.

In testimony that I claim the above I hereunto set my hand.

HORACE B. CAMP.

In presence of—
C. E. HUMPHREY,
C. P. HUMPHREY.